Figure 1:
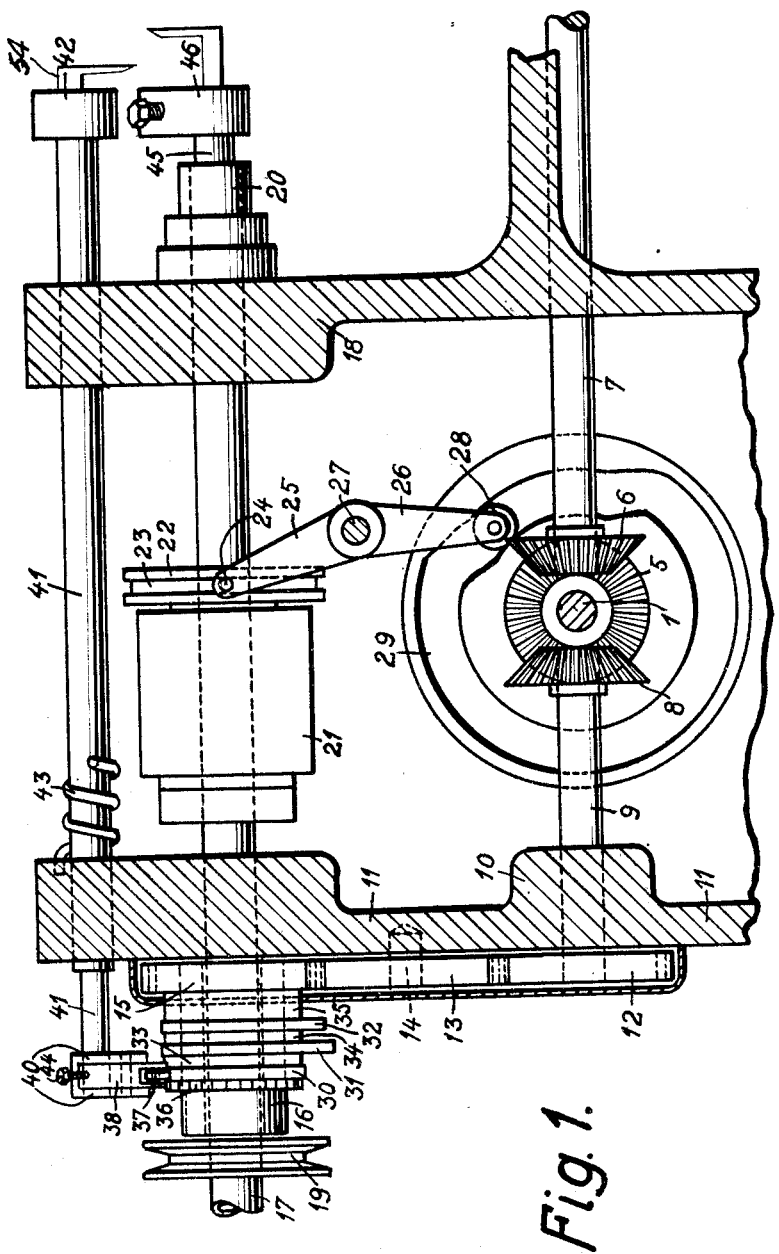

Jan. 23, 1951   G. A. PETERSEN ET AL   2,539,320
AUTOMATIC LATHE

Filed Jan. 8, 1947   2 Sheets-Sheet 2

Inventors
GUNNAR ALEX PETERSEN +
WALTHER CARL MAGNUS DIETRICH
By *Haseltine, Lake & Co.*
Attorneys Patented Jan. 23, 1951

2,539,320

UNITED STATES PATENT OFFICE 2,539,320

AUTOMATIC LATHE

Gunnar Alex Petersen, Klampenborg, and Walther Carl Magnus Dietrich, Copenhagen, Denmark Application January 8, 1947, Serial No. 720,719
In Denmark October 13, 1942

Section 1, Public Law 690, August 8, 1946
Patent expires October 13, 1962

3 Claims. (Cl. 82—19)

This invention relates to an automatic lathe in which the movements during the various operations, such as for instance the advance of the material and the feed movement of tools mounted in tool rests or holders, are so controlled by cams driven from a common shaft as to make one revolution during the production of each work piece.

Automatic lathes of this type are generally provided with two sets of tool holders, namely one set in connection with the head stock, this set customarily comprising two or more slides movable towards the head stock and/or two or more rocking tool holders located in the head stock, and one set in connection with the tail stock.

The present invention relates to the mechanism of an automatic lathe for driving the tool holders in connection with the head stock, and, therefore, the description which follows refers exclusively to the elements of the head stock.

In the known automatic lathes in which the tools are controlled by cams, the latter are generally mounted on a common shaft alongside the head stock, and each of the cams drives the tool holder or other operating member belonging thereto through a chain of connecting elements which most often include a toothed segment engaging a rack or another toothed segment or a gear wheel which is connected with the driven member either directly or through further connecting elements. In this chain of connecting links, however, various possible inaccuracies may arise, because a single metal chip or other foreign body, accidentally interfering with the teeth of the gearings, may displace the tool holder a great distance with respect to the accuracy with which the lathe should work. Furthermore, the cam shaft being mounted alongside the spindle, the survey of the cams and their immediate positions will be less good.

These inconveniences are overcome by the present invention, according to which the cams for the tools mounted in tool holders at the front side of the head stock and for a stop for the advance of the material, are mounted coaxially with the spindle at the rear end of the head stock, and the cams are preferably removably secured to a sleeve capable of turning on the spindle and carrying a gear wheel through which the sleeve and the cams are driven.

In this way the cams and the driving mechanisms of the tools are positioned as far as possible from the place where the chips are produced, and at any time the conditions of all the cams can be fully surveyed. Furthermore, this arrangement of the cams enables the cams to be directly connected to the tools to be actuated since, according to the invention, each of the tool holders, which in this case must be oscillatingly mounted at the front side of the head stock, may be constituted, as known per se, by, or located on the front end of, rocking shafts disposed in the head stock, each of these shafts carrying at its rear end and arm abutting directly or through a roller against the corresponding cam.

Figure 2:
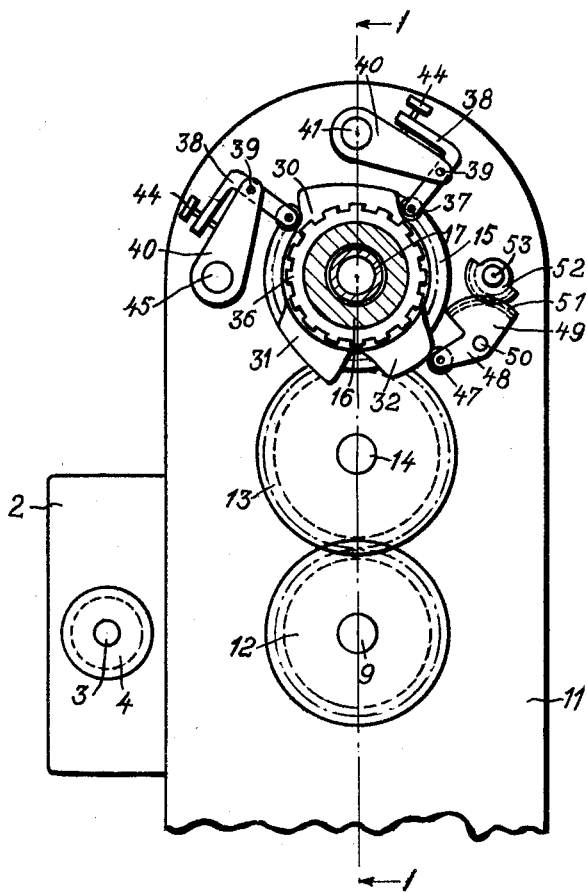

One form of construction of an automatic lathe according to the invention is hereinafter described, by way of example, with reference to the accompanying drawings, in which:

Figure 1 is a cross section through the head stock of an automatic lathe according to the invention along the line I—I of Figure 2, all the parts not concerning the subject of the invention being omitted, and Figure 2 is a rear elevation of the head stock shown in Figure 1.

I is a shaft extending into the head stock and driven by a gear provided in a housing 2, the driving shaft 3 of which carries a V-belt pulley 4, which is driven from an electromotor by means of a V-belt not shown.

At the end extending into the head stock, the shaft I carries a bevel wheel 5, partly engaging a bevel wheel 6 secured to a shaft 7, which extends forwardly in the machine and serves to drive the tools provided at the tail stock, and partly engaging another bevel wheel 8 secured to a shaft 9, which is located in a bearing 10 in the rear wall 11 of the head stock and passes through it. The wheels 5, 6 and 8 are of equal size.

At the end extending from the wall 11, the shaft 9 carries a gear wheel 12 engaging an intermediate gear wheel 13 mounted on a shaft 14 which is fastened in the wall 11. The gear wheel 13 engages with a gear wheel 15 having the same number of teeth as the gear wheel 12. The gear wheel 15 is secured to the inner end of a sleeve 16 rotatably mounted on a hollow spindle 17 located partly in the wall 11 and partly in the front wall 18 of the head stock.

The bar material to be worked is introduced through the hollow spindle 17 which is driven by means of a V-belt pulley 19 mounted near the rear end thereof and clamped by a chuck 20 mounted at the front end of the spindle 17. The chuck 20 is actuated in a manner known per se by means of a clamping mechanism 21 which is mounted on the spindle inside the head stock, and the details of construction of which do not require to be described. A member 22 effecting the clamping movement and being mounted on the spindle 17 so as to rotate therewith and slide longitudinally thereon has a circular groove 23 engaged by pins 24 on a bifurcated upper arm 25 of a bell crank lever located on a fast shaft 27. The lower arm 26 of the bell crank lever carries at its end a roller 28 by which the lever arm 26 abuts against a cam 29 fastened on the shaft 1 and adapted to engage and disengage the chuck 20.

Cams 30, 31 and 32 are mounted on the sleeve 16 being kept spaced apart by washers 33, 34, the inner cam 32 being spaced apart from the gear wheel 15 by a washer 35 preferably in the form of a hub on the gear wheel 15. The cams 30, 31, 32 and the washers 33, 34 are fastened to the sleeve by means of a nut 36 screwed thereon.

A roller 37 runs on the cam 30, being carried by a bell crank lever 38 pivoted on a pin 39 secured in an arm 40. The latter is secured to a shaft 41 oscillatingly mounted in the walls 11 and 18, carried through the head stock, and carrying at its front end a tool holder 42. A coil spring 43 mounted on the shaft 41 is fastened at one end to the wall 11 and at the other end to the shaft 41. The spring 43 is so mounted as to tend to turn the shaft 41 and the arm 40 with the bell crank lever 38 clockwise thereby causing the roller 37 constantly to abut against the cam 30. A set screw 44 screwed through one arm of the lever 38 approximately parallel to the arm 40, abuts against the upper surface of the arm 40, being intended to effect the fine adjustment of the tool 54 fastened in the tool holder 42.

The cam 31 is connected to a corresponding shaft 45 carrying a tool holder 46 at the front side of the head stock in the same manner as the cam 30 is connected to the shaft.

A roller 47 mounted on one arm 48 of a bell crank lever runs on the cam 32, the said lever being pivoted on a pin 50 fastened in the wall 11. The arm 49 of the bell crank lever has a toothed segment 51 engaging with another toothed segment 52 secured to a shaft 53 carried through the head stock. At the front side of the head stock the shaft 53 carries a stop known per se (not shown in the drawings) for limiting the advance movement of the material. No inconvenience is experienced with the driving of the said stop as its rocking movement does not require to be accurate.

The invention is not limited to the form of execution shown in the drawings; the same may be modified in various ways without departing from the scope of the invention. For instance, the shaft 53 may be connected to the cam 32 in the same manner as the shafts 41 and 45 are connected with the cams 30 and 31 or in any other suitable way. Further, more than the three tool shafts 41, 45, 53 shown in the drawings may be used, in which case a corresponding greater number of cams are mounted on the sleeve 18.

We claim:
1. An automatic lathe comprising a head stock, a spindle rotatably mounted in said head stock and having at its front end means for securing work pieces, a plurality of shafts rotatably mounted in said head stock, a plurality of tool holders mounted respectively on said rotating shafts, a sleeve rotatably mounted on the rear end of the spindle, cams mounted on said sleeve, a toothed wheel on said sleeve, a cam shaft, a toothed wheel on said cam shaft, a gear connection between the said toothed wheel on said sleeve and the toothed wheel on said cam shaft, pivotally mounted arms each abutting one of said cams, and means for connecting each of said arms to one of said tool holder shafts, respectively.

2. An automatic lathe comprising a head stock, a spindle rotatably mounted in said head stock and having at its front end means for securing work pieces, a plurality of shafts rotatably mounted in said head stock and extending therethrough, a plurality of tool holders mounted on said rotating shafts, a sleeve mounted rotatably on the rear end of said spindle, cams mounted on said sleeve, a toothed wheel on said sleeve, a cam shaft, a toothed wheel on said cam shaft, a gearing between the said toothed wheel on said sleeve and a toothed wheel on said cam shaft, and arms on the rear end of said tool holder shafts each of said arms abutting against one of said cams.

3. An automatic lathe comprising a head stock, a spindle rotatably mounted in said head stock and having at its front end means for securing work pieces, a plurality of shafts rotatably mounted parallel to said spindle in said head stock and extending therethrough, a plurality of tool holders and a stop mounted respectively on said rotating shafts, a sleeve mounted rotatably on the rear end of said spindle, cams mounted on said sleeve and corresponding in number to said shafts, a toothed wheel on said sleeve, a cam shaft, a toothed wheel on said cam shaft, a gearing between the toothed wheels, an arm on the rear end of each of said shafts each abutting against one of said cams, a gear segment on said shaft carrying said stop, and a corresponding gear segment on one of said arms.

GUNNAR ALEX PETERSEN.
WALTHER CARL MAGNUS DIETRICH.

REFERENCES CITED

The following references are of record in the file of this patent:

UNITED STATES PATENTS

| Number | Name | Date |
|---|---|---|
| 1,158,745 | Tessky | Nov. 2, 1915 |
| 1,658,470 | Watson | Feb. 7, 1928 |
| 1,978,059 | Rickert | Oct. 23, 1934 |
| 2,410,443 | Hoffer | Nov. 5, 1946 |